Nov. 4, 1941.   R. W. ALLEN   2,261,837
BIAS CUTTER
Filed June 29, 1940   7 Sheets-Sheet 1

INVENTOR
Raymond W. Allen

BY Ely D. Frye

ATTORNEYS

Nov. 4, 1941.   R. W. ALLEN   2,261,837
BIAS CUTTER
Filed June 29, 1940   7 Sheets-Sheet 3

INVENTOR
Raymond W. Allen
BY Ely & Frye
ATTORNEYS

Patented Nov. 4, 1941

2,261,837

UNITED STATES PATENT OFFICE 2,261,837

BIAS CUTTER

Raymond Willcox Allen, Akron, Ohio, assignor to The Firestone Tire & Rubber Company, Akron, Ohio, a corporation of Ohio Application June 29, 1940, Serial No. 343,239

12 Claims. (Cl. 164—73)

This invention relates to bias cutters such as are used in the rubber industry, for example, for bias cutting relatively short lengths of rubberized tire building fabric from a continuous strip of the same, and more especially it relates to bias cutters of the horizontal type.

Bias cutters of the character mentioned commonly are of the vertical type, although horizontal bias cutters are not unknown. They usually are equipped with a pitman and pawl and ratchet means for advancing the stock periodically to the cutting means, and the latter moves inoperatively back to point of starting after each operative stroke. In such bias cutters it has been difficult to obtain the extreme accuracy of cutting that is desired, it has required considerable time to alter the apparatus to cut lengths of different widths, and the cutting of relatively wide strips at high speed has been impossible. It is to the improvement of the conditions mentioned that this invention primarily is directed.

Accordingly, the chief objects of the invention are to provide an improved bias cutter wherein accuracy of cutting within allowable tolerances readily is obtainable; to provide a bias cutter that requires a relatively short time to be set up for cutting strips of different widths; to provide a machine of the character mentioned that is readily adapted to cut strips of different widths in a repeating series; to provide increased speed of operation, especially when cutting relatively wide strips of material; and to produce an improved product, as compared to vertical bias cutters, due to less distortion and strain upon the fabric.

Other objects are to provide improved means for removing wrinkles from the fabric prior to the cutting thereof; to provide cutting means that cuts the fabric while traversing the same in both directions; to provide a bias cutter capable of operation with fewer operators than heretofore has been practicable; and to effect substantial savings in the cost of bias cutting operations. Other objects will be manifest as the description proceeds.

Figure 1:
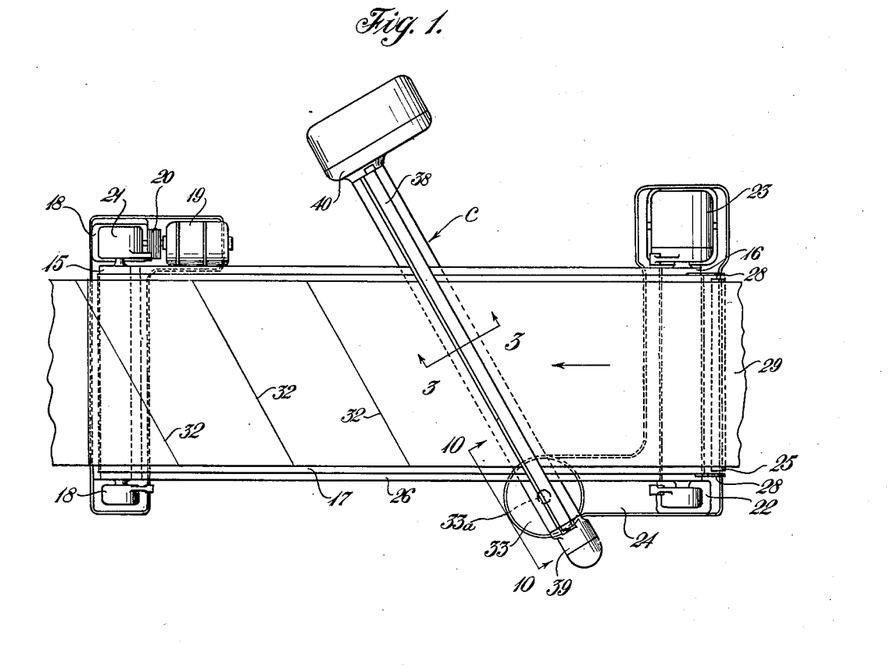
Figure 1 is a plan view of apparatus embodying the invention, in its preferred form.
Figure 2:
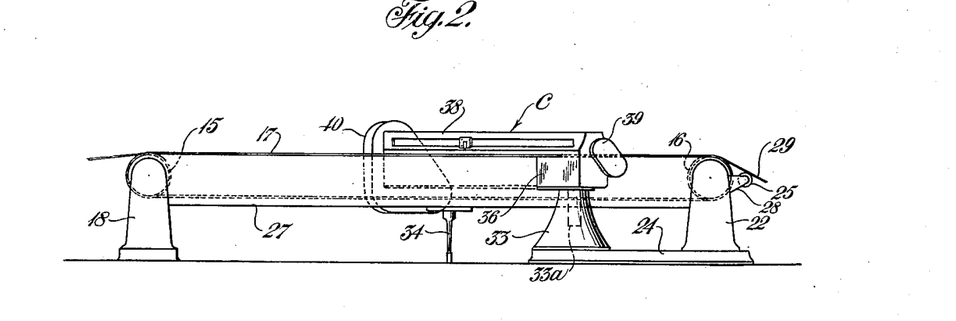
Figure 2 is a side elevation thereof, as viewed from the lower side of Figure 1.

Referring to the drawings, especially Figures 1 and 2 thereof, there is shown a bias cutter comprising a driving roller 15, a driven roller 16, and an endless conveyor belt 17 carried by said rollers. The driving roller 15, which is positioned at the work-delivery end of the apparatus, is suitably journaled at its respective ends in pedestal supporting structures 18, 18. One of the latter constitutes a support for an intermittently driven electric motor 19 that drives the roller 15 through the agency of a plurality of transmission belts 20 and a speed-reduction device 21. Driven roller 16 is journaled at one of its ends in a pedestal supporting structure 22, and at its other end is journaled in suitable bearings carried by a housing that is designated as a whole by the numeral 23, said structure 22 and housing 23 being mounted upon a base plate 24, and being adjustable thereon so that the conveyor belt 17 may be maintained at any degree of tautness. An idler roller 25 is positioned parallel to roller 16, at the work-receiving side of the latter, for guiding the rubberized fabric or other work on to the conveyor belt as it passes over the roll 16. Supported by the frame structures aforesaid is a rigid metal table, the top 26 of which is disposed beneath the upper reach of the conveyor belt 17 and constitutes a support for the latter, said table also having lateral depending aprons, such as the apron 27, Figure 2, at each side thereof. The idler roller 25 is carried by end-brackets 28, 28 secured to the respective table-aprons 27. The work, which usually consists of a continuous strip of rubberized fabric, is shown at 29 in the drawings.

Disposed transversely of the work 29, the upper reach of conveyor 17, and the table top 26 is a cutting instrumentality for severing the work 29 by a succession of transverse cuts such as are indicated at 32, 32, Figure 1. Said cutting instrumentality, designated as a whole by the character C, is mounted at one end upon a pedestal support 33 upon which it is swivelled for angular movement about the center 33a, the other end of the said instrumentality being supported upon a leg 34 that rests upon the floor. Any suitable means may be provided for moving the cutting instrumentality angularly upon its pivotal support 33, the arrangement being such as readily to enable the continuous strip 29 to be cut at any desired bias angle.

Figure 3:
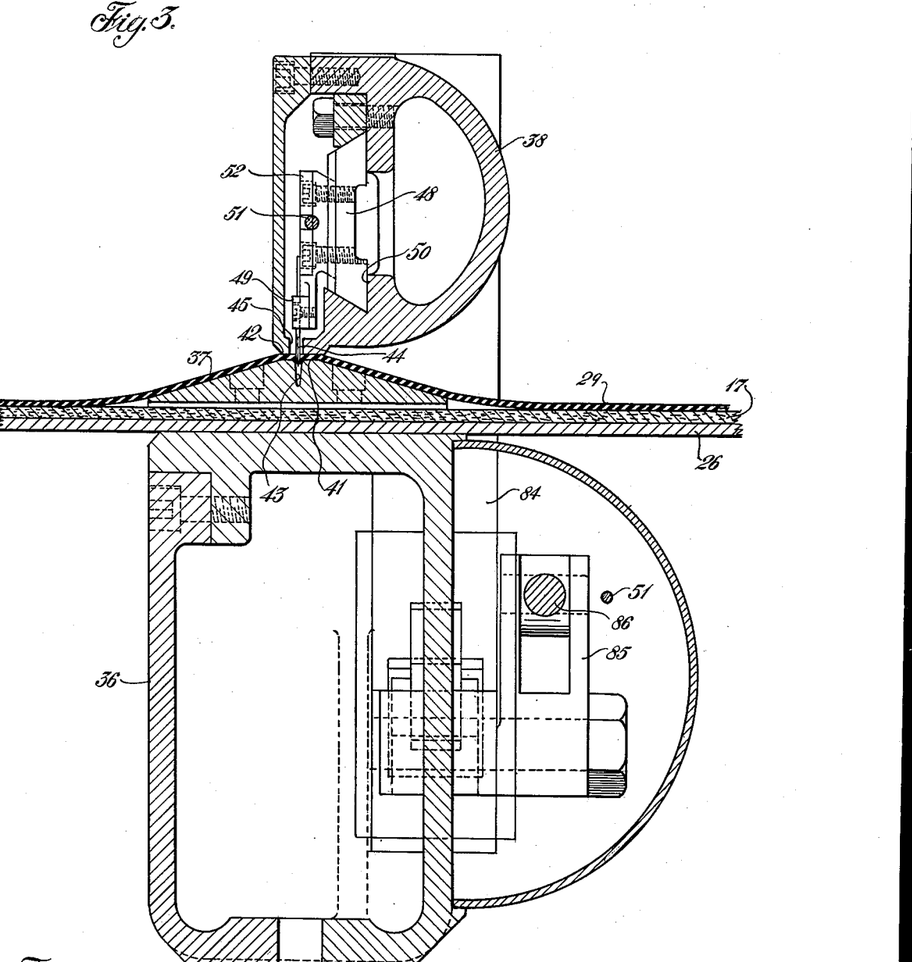
Figure 3 is a section, on a larger scale, on the line 3—3 of Figure 1.
Figure 4:
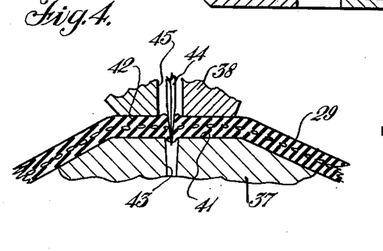
Figure 4 is a fragmentary detail, on a larger scale, of a portion of the structure shown in Figure 3, showing the cutter in the act of severing the work.
Figure 9:
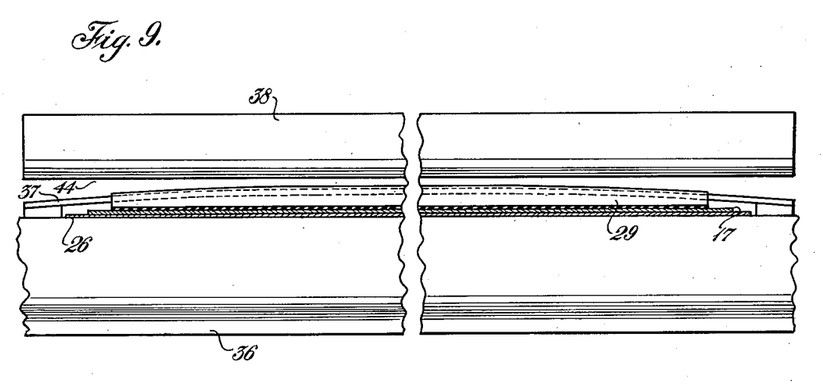
Figure 9 is a somewhat diagrammatic side elevation of the cutting instrumentality of the apparatus, as viewed from the work-receiving side thereof.

The cutting instrumentality C comprises an elongated housing structure 36 that is disposed beneath the table top 26, a flexible spring metal clamp bar 37 mounted above the table top 26 and conveyor 17 and supported at its ends upon said housing structure 36, and a cutter beam 38 positioned above the clamp bar 37 and having vertical reciprocatory movement from and toward the latter. The ends of the cutter beam 38 are slidably mounted in vertical guideways formed in casing structures 39, 40, of which casing structure 39 is mounted upon pivoted end of the housing structure 36 and casing structure 40 is mounted upon the opposite end thereof. The clamp bar 37 is positioned but slightly above the conveyor 17, and is bowed somewhat upwardly at its middle, as is best shown in Figure 9, for a purpose presently to be explained. Transversely, the clamp bar is downwardly sloped from a narrow, flat, longitudinally extending medial region 41 to the respective lateral margins of the bar, the work 29 being separated from the conveyor at the cutting point so that it slides over the top of said clamp bar, as shown best in Figures 3 and 4. The lower surface of the cutter beam 38 also is formed with a flat, longitudinally extending surface 42 that is disposed directly above the flat face 41 of the clamp bar, so that when the cutter beam is in its depressed position, as shown in Figures 3 and 4, the work 29 is securely confined between the opposed faces 41, 42. The clamp bar 37 is formed in its flat face 41 with a longitudinally extending slot 43 adapted to receive a cutter in the form of a double-edge blade 44 that is carried by the cutter beam 38 and which moves from end to end thereof, said blade extending through a slot 45 in the bottom of the cutter beam. Because of the bowed construction of the clamp bar 37, which is exaggerated in Figure 9 so that it can be seen in the drawings, the cutter beam 38 makes progressive contact with the work as it is lowered into engagement therewith, thereby smoothing out any small wrinkles in the work. Furthermore, when the beam subsequently rises from the work it progressively separates therefrom, and the work does not adhere to the bottom of the beam so as to be lifted from the clamp bar. This is an important feature of the invention since it enables the severed work readily to be moved forward over the clamp bar after a cutting operation. The tension of the clamp bar when it is depressed for the cutting operation, also operates to impart a slight tension in the work passing thereover, which tension facilitates the severing of the work by the blade. The amount which the clamp bar is distorted is so slight that no provision is necessary to compensate for any movement of the ends of the bar.

The blade 44 projects from the slot 45 a sufficient distance to extend completely through the work 29 and into the slot 43 of clamp bar 37, the blade thus being adapted to effect complete severance of the work. The blade is carried by a dovetail slide 48 to which it is adjustably secured by means of a clamping plate 49. The slide 48 is mounted in a horizontal slideway 50 that extends longitudinally of the cutter beam 38, interiorly thereof, said slide being impelled longitudinally back and forth along the slideway by means of a cable 51 that is secured to the slide by means of a clamping plate 52. The blade is moved by the cable intermittently back and forth along its traverse in determinate time relation to the raising and lowering of the cutter beam 38, the mechanism for effecting such periodic movement of blade and beam being mainly enclosed within the casing structure 40.

Figure 5:
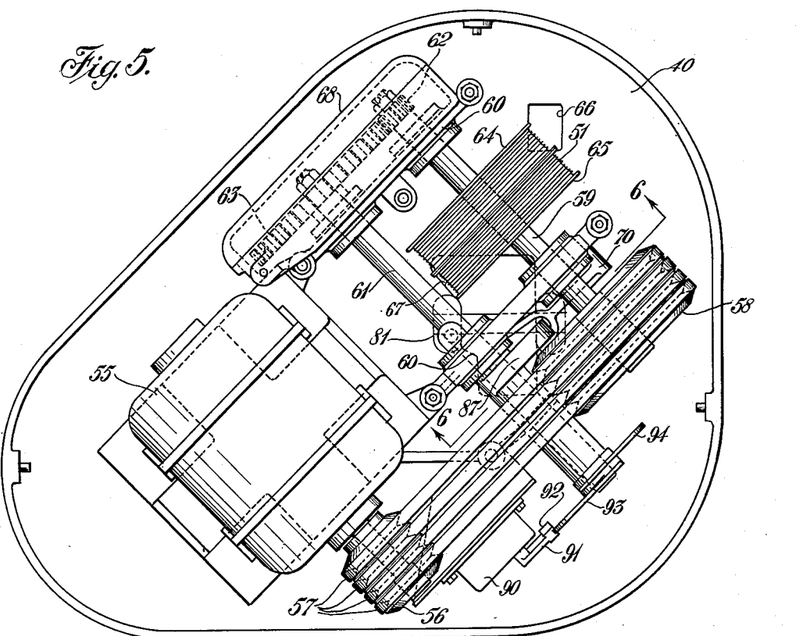
Figure 5 is an elevation of the cutter-operating mechanism.
Figure 6:
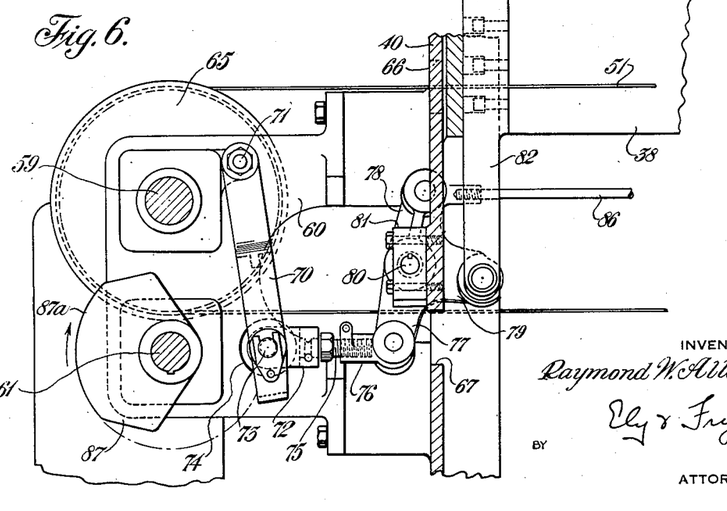
Figure 6 is a section on the line 6—6 of Figure 5.

Mounted within the casing 40 is a reversible electric motor 55 that is periodically energized during the intervals between the feeding movements of the conveyor belt. Mounted upon the drive shaft of motor 55 is a multi-grooved pulley 56 about which is trained a plurality of endless transmission belts 57, 57, the latter also being trained about a somewhat larger multi-grooved pulley 58 that is mounted upon one end of a counter-shaft 59. Said counter-shaft 59 is journaled in a pair of bearing brackets 60, 60 that are mounted upon a wall of the casing 40, said brackets also carrying a cam shaft 61 that is journaled therein parallel to shaft 59. The end of the latter remote from pulley 58 carries a relatively small gear 62 that is meshed with a relatively large pinion 63 on the adjacent end of the cam shaft, the arrangement being such as to effect the driving of the cam shaft, but at slower speed than that of the counter-shaft. As shown in Figure 5, the gears 62, 63 may be enclosed in a suitable housing 68. Intermediate its ends the counter-shaft 59 carries a pair of grooved pulleys 64, 65 that are disposed side by side and to which the respective ends of the cable 51 are connected, one end of the cable extending through a rectangular opening 66 in the casing wall and being connected to pulley 64, the other end of the cable extending through a larger opening 67 of irregular shape in the casing wall and being connected to pulley 65. At the far end of the cutting instrumentality C, the cable 51 is trained about a sheave 69, Figure 10, that is mounted in the casing 39, the upper reach of the cable, to which the cutter slide 48 is secured, being disposed within the cutter beam 38 and the lower reach of the cable being disposed within the housing structure 36. The cable is wrapped in opposite directions about the two pulleys, so that when the counter-shaft 59 is rotated in one direction, the cable 51 is let off of pulley 64 and wound onto pulley 65, thus moving the knife-slide 48 from one end of its traverse to the other. The operation is reversed when the counter-shaft 59 is rotated in the opposite direction.

The cutter is raised and lowered while the cable 51 is stationary, and in order to accomplish this operation, a lever 70 is pivotally mounted at 71 upon a lateral face of the journal bracket 60 that is disposed nearest pulley 58, the free end portion of said lever being open or slotted to receive the jaws of a clevis 72 that are pivotally connected to the lever by a hinge pin 73. Between the jaws of the clevis a cam roller 74 is journaled on the pin 73. Secured at one end to the clevis 72 is an adjustable connecting link 75, the other end of which is threaded into an eye 76 that is pivotally connected to one arm 77 of a three-arm crank. The latter comprises an arm 78 that is in alignment with arm 77, and an arm 79 that is disposed at right angles to arms 77, 78, the crank being pivotally mounted upon an axially disposed pivot pin 80 carried by the casing 40. Said pin 80 spans the opening 67 in the wall of the casing 40 and is supported at its ends in respective pin blocks 81 at each side of said opening, the crank arm thus being enabled to operate through the latter. The crank arm 79 extends substantially horizontally through opening 67, and has its free end pivotally connected to the lower end of a vertically disposed guide bar 82 that is slidably mounted in a guideway in the casing structure 40. One end of the cutter beam 38 is secured to the upper end of the guide bar 82.

Figure 10:
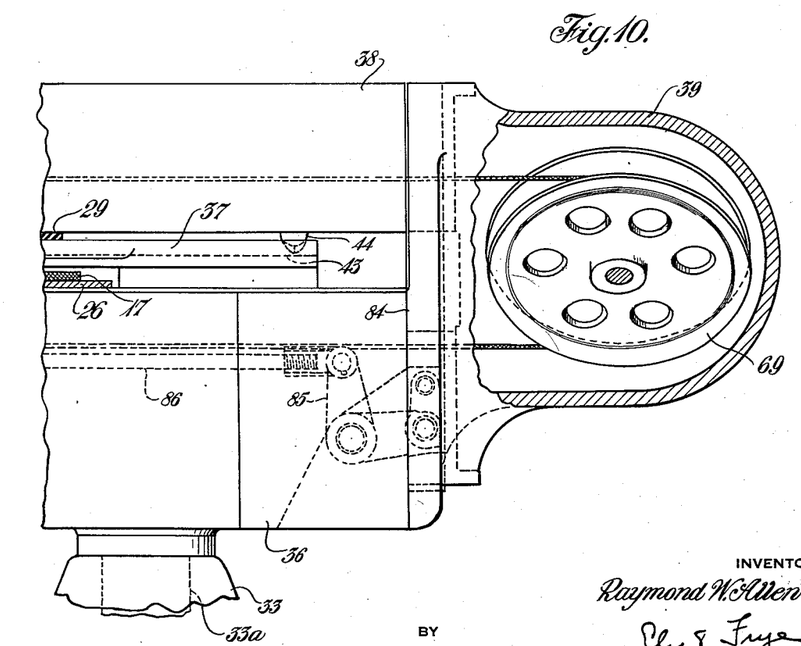
Figure 10 is an elevation of the near end of the cutting instrumentality as viewed from the line 10—10 of Figure 1, a part thereof being broken away.

In like manner the other end of the cutter beam 38 is secured to the upper end of another slidable guide bar 84, Figure 10, and the lower end of the latter is pivotally connected to a bell crank 85 by means of which it may be raised and lowered in unison with the guide bar 82. To this end one arm of said bell crank is connected to one end of a pull rod 86, which pull rod is disposed within the housing structure 36 and has its other end connected to the upwardly extending arm 78 of the lifting crank. Power means is provided for moving the lifting crank angularly in the direction that effects the lifting of the cutter beam 38, the force of gravity being utilized for lowering the cutter beam when the power means is disengaged therefrom. Said power means comprises a cam 87 that is mounted upon the cam shaft 61, said cam having a minor portion of its periphery formed with a cam surface 87a that is adapted to engage the cam roller 74 and thus to operate the lifting cam during rotation of the cam shaft 61.

As previously stated, the motor 55 is reversible, and is periodically energized in determinate time relation to the operation of motor 19, the motor 55 being driven during intervals that motor 19 is idle. Means by which the motor 55 is energized presently will be explained. The drive of the motor 55 is stopped automatically after it has made a number of revolutions, sufficient to move the blade from one end of its traverse to the other, and to this end a pair of limit switches, such as the switch 90, Figure 5, are provided. Said switches are provided with respective operating levers 91, 92, which levers project into the orbits of respective cams 93, 94 that are mounted beside each other upon the cam shaft 61. The arrangement is such that cam 93 stops the motor when the cam shaft is rotating in one direction, and the cam 94 stops it when it is rotating in the opposite direction. The switches operated by the levers 91, 92 also include switching elements that are in the circuit of the motor 19, and operate in alternation to the other switch elements operated by said levers, so that the motor 19 is energized and set in motion concurrently with the stopping of the motor 55, as will hereinafter appear from the description of the control circuit diagram. The said cams also are arranged to stop the cam shaft substantially before it has made a complete revolution, but the speed reduction effected by the gears 62, 63 is such that the countershaft 59 makes several revolutions during the same interval, sufficient for the pulleys 64, 65 to cause the cutter slide 48 to move from one end of its traverse to the other. The cams 93, 94 also are determinately positioned with relation to cam 87 so that stoppage of the motor 55 is effected immediately after the cam surface 87a moves into engagement with the cam roller 74.

As previously stated, the motor 19 is intermittently driven, and the motor 55 is intermittently driven, in opposite directions, at intervals during which the motor 19 is idle. Furthermore, the stopping of the drive of motor 19 is effected gradually. The width of the bias strip to be cut by the apparatus is controlled by the number of revolutions made by the motor 19 during each of its operative phases, and the speed of the motor 19 is manually controllable.

The housing 23 encloses control means for automatically starting and stopping the motor 19 to determine the length of the cuts of the fabric. To this end, the driven roller 16, carrying one end of conveyor belt 17, is coupled to a cam wheel 122 through a speed changing mechanism which is capable of providing an infinite number of steps of speed ratios within its range of change. This speed changing mechanism and the motor control including the cam wheel 122 and its associated switches are shown in detail in Figures 7 and 8.

Figure 8:
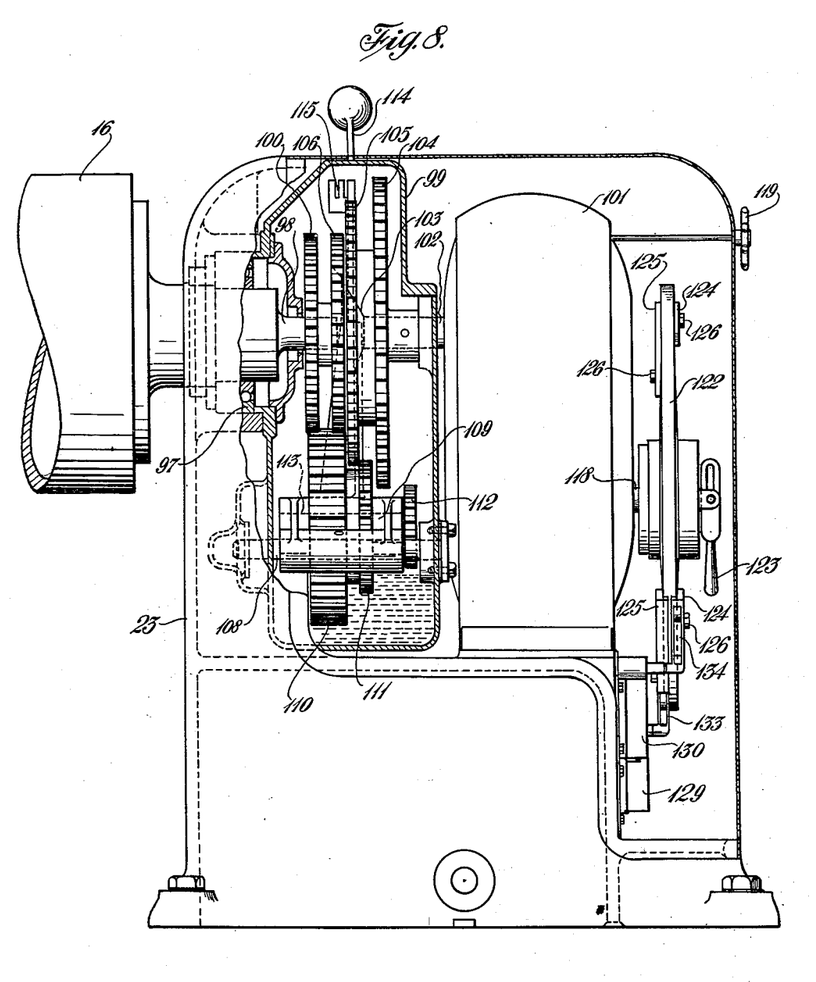
Figure 8 is a side elevation of the mechanism shown in Figure 7, as viewed from the left thereof, parts being broken away and in section.

As is best shown in Figure 8, the conveyor roller 16 is journaled at one end in a bearing 97 carried within the housing 23, the end portion of the roller having an axial extension 98 of reduced diameter that projects into a gear case 99 mounted within the housing. A gear 100 is mounted upon the extension 98 near the end thereof. The gear case 99 is mounted upon one lateral wall of the housing of a variable speed transmission device 101 that also is mounted within the housing 23, a shaft 102 of said transmission device extending into the gear case 99 in axial alignment with the roller extension 98 therein. Mounted upon the shaft 102, interiorly of the gear case 99, is a hub 103, and bolted to the latter are ring gears 104, 105, and 106 respectively, of which gears 105 and 106 are disposed adjacent each other at the outer end of the hub, and gear 104 is spaced somewhat from gear 105. Gear 106 is disposed adjacent gear 100 and is of the same diameter as the latter. Gear 105 is somewhat larger than gear 106, and gear 104 is larger than gear 105. Pivotally mounted for angular movement upon a pivot pin 108 is a pinion bracket 109, the latter being disposed on an axis parallel to the axis of shaft 102 and roller extension 98, and being supported from its opposite ends that are mounted in opposite walls of the gear case 99, near the bottom thereof. The bracket 109 is of such length as to be capable of axial movement along said pivot pin. Carried by the pinion bracket 109 are three idler pinions 110, 111, and 112, respectively, of which pinion 110 is of sufficient width to mesh with gears 100, 106. The pinion 111 meshes with gear 105, and gear 112 meshes with gear 104 when the gears are shifted to their different positions. The three pinions are secured to a common shaft 113 that is journaled in the pinion bracket, the arrangement being such that all three pinions are driven in unison by the gear 100, with which the pinion 110 normally is meshed, in all axial positions of the pinion bracket.

As shown in Figure 8, pinion 110 is meshed with gears 100, 106, and since said gears are the same size, gear 106 is driven at the same speed as gear 100. Pinion 111 is so positioned that when bracket 109 is moved one space to the left, pinion 110 will move out of engagement with gear 106 and pinion 111 will mesh with gear 105. Pinion 111 is one-half the diameter of gear 105, shaft 102 being thereby driven at one-half the speed of the roller 16. When bracket 109 is moved two spaces to the left pinion 112 will move into mesh with gear 104, pinion 110 still remaining in mesh with gear 100. Pinion 112 is one-fourth the diameter of gear 104 with the result that there is a 4 to 1 speed reduction between roller 16 and shaft 102. The bracket 109 is provided with an operating lever 114 by means of which it may be moved angularly to a limited degree to disengage the gears and pinions, and moved axially along the pivot pin 108, said lever extending outwardly through the gear case 99 and housing 23. A slotted plate 115 is provided for retaining the lever 114 in different positions of adjustment.

The variable speed transmission device 101, of which the shaft 102 is the driving member, also comprises a driven shaft 118. The transmission device 101 is of a type well known to industry, being commonly known to trade as a "P. I. V." (positive, infinite, variable) transmission. Accordingly it is believed that a detail description thereof will not be required, it being sufficient to note that the mechanism of the device is capable of effecting infinite speed variation between drive shaft 102 and driven shaft 118 through a ratio range of from ½ to 1 up to 1½ to 1. Thus by means of the change-speed gearing aforementioned in combination with the transmission device 101, an infinite number of speed ratios, between determinate limits of utility, are available for driving the shaft 118 from the roller 16. The transmission device 101 is provided with an operating handle 119 by means of which the drive ratio may be controlled, said handle being located exteriorly of the housing 23 so as to be conveniently accessible to an operator.

Means is provided within the housing 23 for effecting the gradual stopping of the rotation of motor 19, and to this end a cam wheel 122 is mounted upon driven shaft 118 of the transmission device 101. Said cam wheel is readily removable from said shaft by means of a latch 123, thus enabling other cam wheels quickly to be substituted when desired. The cam wheel 122 is formed with a perforated peripheral flange upon which cams 124, 125 are removably mountable by means of suitable bolts 126. As is best shown in Figure 8, the cams 124 are disposed on one side of the center line of the periphery of the cam wheel 122, and are of shorter length than the cams 125 which are positioned on the opposite side of the centerline of the cam wheel. The relative lengths of cams 124 and 125 are not important, provided that the cam 125 is long enough to maintain arm 133 in closed position when cam 124 moves the arm 134 to closed position. The relative lengths of the cams are therefore dependent upon the relative spacing between the slow down switch and the final stopping switch. Mounted upon a wall of the housing 23, below the cam wheel 122, are four electrical switches 127, 128, 129, and 130 respectively, which switches are provided with operating arms 131, 132, 133, and 134 respectively, of which operating arms 131, 132, and 133 extend into the orbit of the cams 125 and the operating arm 134 extends into the orbit of the cams 124. The switches 127 to 130 are so positioned that the cam 125 operates switches 127, 128 and 129 before cam 124 operates switch 130 as the cam wheel 122 rotates in a clockwise direction as indicated by the arrow in Figure 7. The switches 127 to 129 are so-called "slow down" switches; that is, they control the power supply to the motor 19 to slow down the speed of rotation thereof to a low speed as the conveyor 17 brings the fabric strip 29 to a point to be cut so that the final switch 130 controls the motor to stop the fabric within the allowable tolerances. The length of the cams 125 is greater than the distance between the switch arms so that a succeeding arm is engaged before the cam passes out of engagement with the preceding arm.

The switches 127 to 129 are each adapted to reduce the speed of the motor 19 in the same manner. The length of the cam 125 is so correlated to the angular disposition of the switches 127 to 129 to reduce and maintain the reduction of speed of the motor 19 after the cam 125 strikes the first one of the series of switches. The final switch 130 is operated by the cam 124 before the cam 125 passes beyond the switch arm 133 of the switch 129, the last preceding switch. Switch 130 effects final stopping control of the motor 19, by disconnecting the source of power from the motor 19 and is preferably adapted to apply braking action in accordance with usual known methods.

Figure 11:
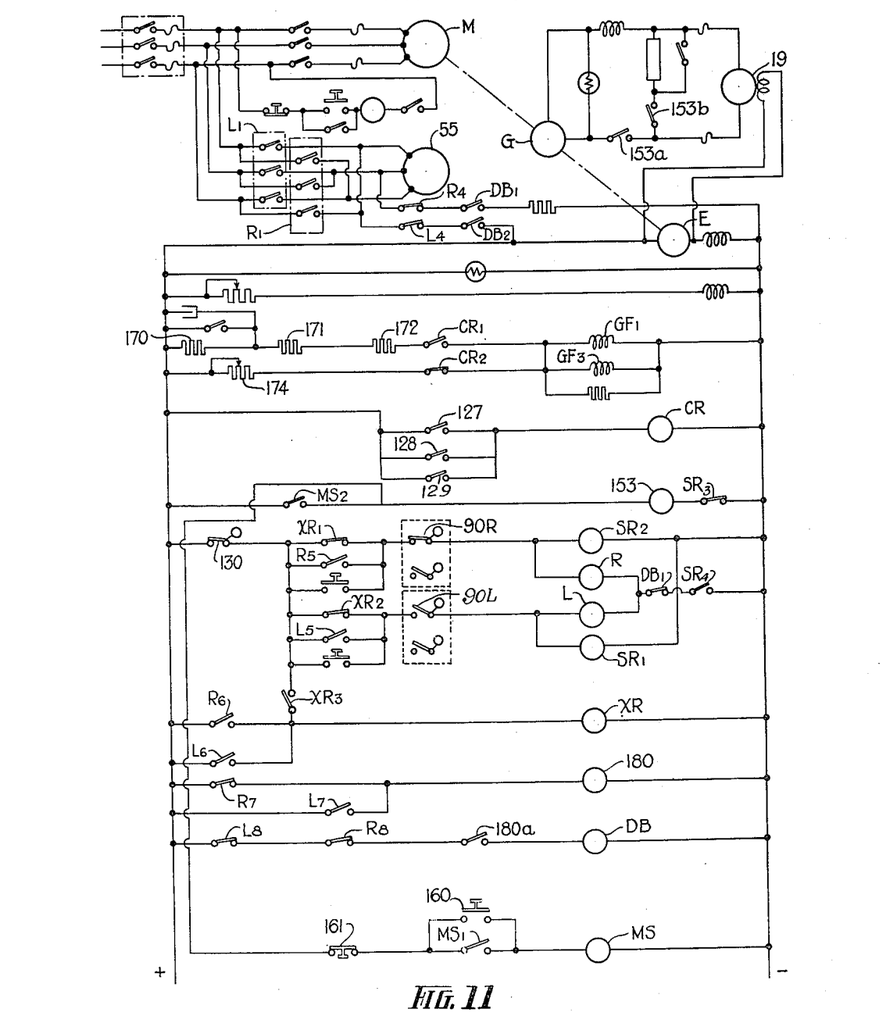
Figure 11 is a schematic wiring diagram of the electrical control circuit for controlling the operation of the conveyor and knife motors.

The electric control of the conveyor and knife motor comprises an alternating current motor M, which drives a direct current generator G and a separate exciter E. The exciter E supplies the exciting field for the conveyor motor 19 and for supplying direct current braking power for the alternating current knife motor 55.

The generator has two shunt fields indicated at $GF_1$ and $GF_3$. These fields are hooked in parallel with resistances 170, 171, and 172 in one leg of a parallel branch circuit. Another circuit paralleling these resistances includes an adjustable generator field rheostat 174. The power through resistances 170, 171, and 172 is controlled by relay contacts CR1 and the circuit through the generator field rheostat 174 is controlled by relay contacts CR2. The total value of the resistances 170, 171, and 172 is greater than that of the rheostat 174. The relay contacts are operated by a holding coil CR, which, in turn, is controlled by slowdown relay switches 127, 128, and 129.

The cams 125 operate the relay switches 127, 128, and 129. When the cam 125 closes the first of these switches, the holding coil CR is energized, which, in turn, closes relay contacts CR1 and opens contacts CR2. Since the resistance in the circuit through CR1 is greater than the resistance of the circuit controlled by contacts CR2, the generator field will be reduced and consequently the generator voltage will drop and the motor 19 will slow down. As the conveyor continues to operate at reduced speed, the cam 124 hits the arm of the switch 130, closing the latter, which energizes the holding coil SR2, which in turn opens relay contacts SR3. This de-energizes the holding coil 153 and permits contacts 153a to open the circuit to the motor 19. At the same time, the contacts 153b close and apply dynamic braking to the motor 19 to bring it to a quick stop. One of the novel features of the control system used here to obtain speed and accuracy in stopping the motor is the slowdown switches, which reduce the voltage to the motor so that it decelerates to a lower speed. The distance between, and the length of the cams 124 and 125, is such that the speed of the motor 19 has just ceased to decelerate at the instant that the stopping switch 130 is closed, which, through the control system described, applies dynamic braking to the motor to bring it to a very quick stop within very close tolerances.

When the motor 19 stops, the cam 124 holds the switch 130 in closed position, which maintains a closed circuit through holding coil SR2. This opens relay contacts SR3, and closes relay contacts SR4, energizing relay holding coil R. Relay holding coil R closes the contacts on controller R1 to start the knife motor 55 in the direction to move the knife toward the right-hand side of the conveyor when looking in the direction of the arrow on Figure 1. Here it should be pointed out that the limitation switches 90R and 90L are normally held shut by springs and are opened when the knife is on the respective sides. The contacts of the controller R1, R4, R5, R6, R7, and R8, are mechanically connected together so that they all operate simultaneously. Therefore, at the instant that R1 closes, the contacts of R5 are closed around contacts XR1. Relay contacts R6 close the circuit through holding coil XR, which opens contacts XR1 and XR2 and, at the same time, closes contacts XR3. The latter contacts maintain holding coil SR2 in energized condition as long as the switch 130 is closed, regardless of the position of contacts R6. This completes the energization of the motor 55 and the closing of the auxiliary circuits.

As the knife 44 moves from the left-hand side of the conveyor, switch 90L closes. This would energize holding coil L, if it were not for the fact that contacts SR4 had not been previously opened. As the knife approaches the right-hand side of the conveyor, limit switch 90R is opened, de-energizing holding coil R and holding coil SR2. The de-energization of holding coil R causes the contacts of the controller R1 to open and stop the knife motor 55. The de-energization of the holding coil SR2 causes contacts SR3 to close and the contacts SR4 to open. When SR3 closes, holding coil 153 is energized to close contacts 153a, restarting the conveyor motor 19. The purpose of the relay contacts SR4 is to maintain the circuits of the holding coils R and L open after the cam 124 has moved off of the arm of the switch 130.

The dynamic braking action on the knife motor 55 is set into operation when the relay contacts R7 are closed. These contacts energize a time relay holding coil 180 which closes relay contacts 180a. The closing of the contacts 180a would establish a circuit through the holding coil DB if it were not for the fact that relay contacts R8 are open. When holding coil R is de-energized, R8 closes, establishing a circuit through holding coil DB. This closes contacts DB1 and DB2, which applies direct current to the field windings of the alternating current motor 55 to effect dynamic braking and bring the motor to a quick stop.

Due to the fact that when the knife carriage is on the right-hand side the limit switch 90L is closed, a circuit is set up to reverse the operation of the knife motor 55. Therefore, when the cam 124 again closes the limit switch 130 on the conveyor mechanism, the holding coil SR1 is energized through XR2 and 90L. This opens the relay contacts SR3 and closes the relay contacts SR4. The opening of the relay contacts SR3 de-energizes the holding coil 153, which, in turn, opens the switch contacts 153a to de-energize the conveyor motor 19. At the same time, when the relay contacts SR4 close, the holding coil L is energized and the contacts of the controller L1 are closed, which energizes the knife motor 55 to operate this motor in the reverse direction. Since the contacts of L1 and the contacts of L4, L5, L6, and L7 are mechanically connected together, the relay contacts L5 close around the relay contacts XR2. The closing of the relay contacts L6 energizes the holding coil XR to open relay contacts XR1 and XR2. At the same time, the relay contacts XR3 are closed, maintaining the holding coil XR energized as long as the limit switch 130 is closed, regardless of the position of L6. As the motor 55 starts and moves the knife from the right-hand side, the limit switch 90R closes and sets up the circuit to repeat the other half of the cycle which has already been described.

The sequence of the operations described above, commenced with the assumption that the knife motor 55 was inoperative and the conveyor motor was operative to move the conveyor belt in the direction of the arrow on Figure 1. The control is entirely automatic, once the starting circuits have been energized. For the purpose of energizing the starting circuits, a remote control circuit is employed which includes a starting switch 160 and a stopping switch 161, holding coil MS and holding contacts MS1 in parallel to the starting switch 160. The holding coil Ms also controls the relay contacts MS2, which are in series with the holding coil 153. In starting the control into operation, the push button 160 is closed, energizing holding coil MS, which closes relay contacts MS1 and MS2. When the relay contacts MS1 are closed, the circuit through the holding coil MS is established and the energization of the holding coil 153 through the relay contacts MS2 closes the relay contacts 153a to start the operation of the conveyor motor. In order to stop the cycle of operations set up by the closing of the push button 160, it is only necessary to open the stop button 161 to temporarily break the circuit through the holding coil MS1. When this happens the contacts MS1 and MS2 drop out and the holding coil 153 is de-energized, which, in turn, opens contacts 153a, stopping the conveyor motor 19.

Figure 7:
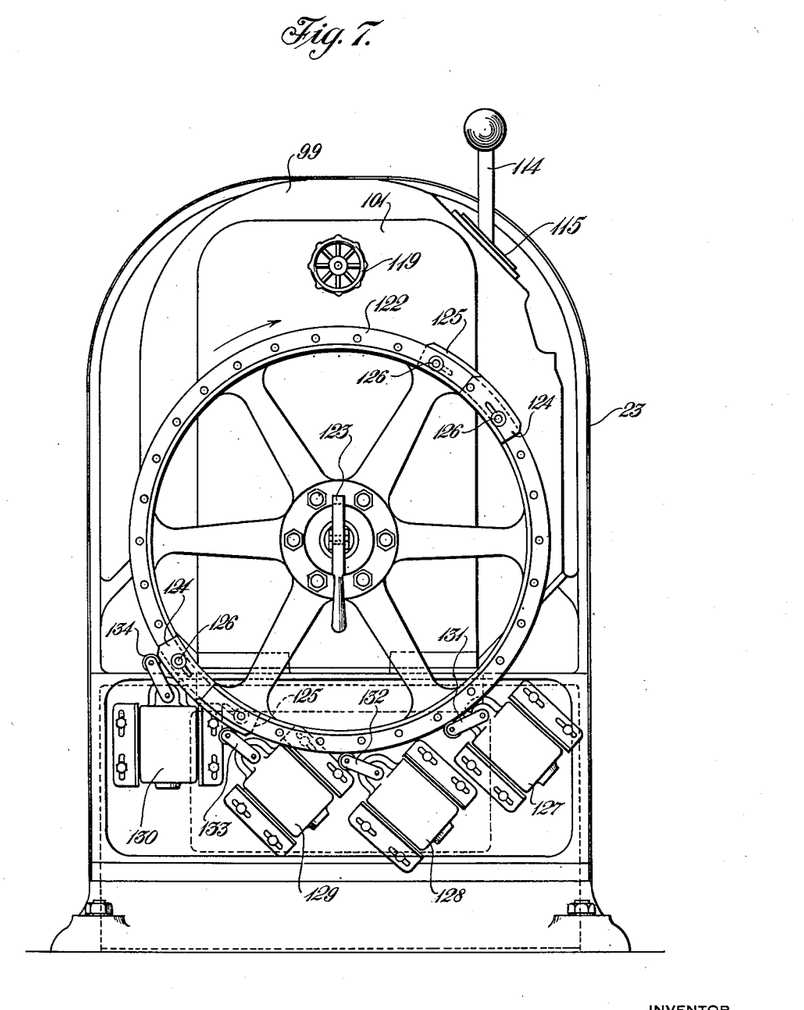
Figure 7 is an end elevation of conveyor-indexing mechanism located at the work-receiving end of the apparatus, the cover of the housing of said mechanism being removed.

As shown, the apparatus is provided with the three "slow-down" switches but fewer or more may be used as desired. It will be readily apparent that the length of cut is doubled by taking off one set of cams 124, 125. The number and arrangement will usually be determined by the length of the cut desired and the speed at which it is desired to operate the apparatus. If it is desired to make cuts of longer length it will also usually be desired to operate the apparatus at higher speed to reduce the time of travel between cuts. Generally speaking, at the higher speeds the first "slow down" switch should be advanced angularly a greater amount from the final switch 130, in the direction opposite to that of the rotation of the cam wheel 122.

By correlating the position of the "slow-down" switches, the position of the cams 124 and 125 and varying the ratio of the speed changing mechanism operating the cam wheel 122, various lengths of cuts may be obtained, and also the control of the speed of movement of the material can be adjusted to get the most practical operating speeds for the different length cuts. As shown in Figure 7, two sets of cams 124, 125 are shown spaced 180 degrees apart on the cam wheel 122. This setting effects two cuts of equal length per revolution of the cam wheel 122. By changing the relative positions of the two sets of cams 124, 125, cuts of unequal length may be made. This is advantageous where it is desired to have fabric strips of different lengths but having the same cord angle. In usual practice, where it is desired to make cuts of various lengths, a plurality of cam wheels 122 having the cams 124, 125 spaced for the desired length of cuts will be provided. The length of cut can then be very readily and quickly varied by changing the cam wheels.

From the foregoing description it will be readily apparent that the spacing of the cams on the cam wheel 122 provides the rough adjustment of the length of the cuts, while a vernier adjustment is provided by the gear changing mechanism between the roller 16 and the cam wheel. The speed change ratio obviously varies the amount of rotation of the roller 16, and consequently the travel of the conveyor belt 17 between operations of the switch 130. By combining the speed change ratio and the spacing of the cams, a wide range of control can be obtained for stopping the conveyor belt accurately within predetermined limits.

The switch 130 also comprises switch elements that are in the circuit of the motor 55 and serve to close the latter concurrently with the opening of the circuit of motor 19, to start the drive of said motor 55. The direction of the drive of the motor 55 depends upon which cam, 93 or 94, last functioned to stop the drive of said motor.

From the foregoing it will be apparent that the space between cuts 32 of the work 29 depends upon the amount of rotation of the driven roller 16 during each operative phase, and this in turn is controlled by the speed of the motor 19 and the intervals elapsing between successive operations of switch 130 by the cams 124.

In addition to the electrical switches shown, other electrical switches may be mounted at one or more points on the frame-work of the apparatus to enable the apparatus to be started, and to enable manual stopping of the same. Otherwise the operation of the apparatus, except for the removing of the finished work therefrom, is fully automatic.

Briefly the operation of the apparatus is as follows: First, the leading end of the continuous strip 29 to be cut is mounted upon the conveyor belt 17 and passed over the clamp bar 37 and under the cutter beam 38. The operator then presses a starting button to set the apparatus into operation. Assuming that the previous stopping of the apparatus occurred immediately after the cutting of the work by the blade 44, the first phase of the succeeding operative cycle will be the starting of the motor 19. This drives the conveyor belt 17, toward the left as shown in Figure 1, and thus moves the work toward the delivery end of the apparatus. The feed of the strip 29 as described moves it over the clamp bar 37, with the result that a slight local tension is imparted to the strip at this point. The driving of conveyor 17 causes rotation of the conveyor roller 16, and the latter drives the cam wheel 122 through the agency of the gearing and the variable speed changing device 101. Thus the speed differential between the roller 16 and the cam wheel 122 may be adjusted to any desired ratio. Rotation of said cam wheel eventually brings its cam 125 successively into operative engagement with switches 127, 128, and 129 to slow down the speed of the motor 19, and then carries its cam 124 into operative engagement with limit switch 130, thereby stopping the motor 19. As previously described, the interlock control of the motors 19 and 55 causes the motor 55 to start to rotate in the opposite direction to its previous direction of rotation. The immediate result of the driving of motor 55 is to move the cam surface 87a of cam 87 out of engagement with cam roller 74, thus enabling the cutter beam 38 to descend, by gravity, so that its bottom surface 42 engages the work 29 thereneath and presses the latter against the flat surface 41 of the clamp bar 37. Since the latter is slightly upwardly bowed at its middle, contact of the cutter beam will be progressive in opposite directions from the middle of the beam, with the result that the fabric is uniformly clamped throughout its transverse extent. Driving of the motor 55 also rotates countershaft 59 and with it the pulleys 64 and 65 whereby the cable 51 is let off of one pulley and re-wound upon the other. This draws the slide 48 from one end of its traverse to the other, with the result that the blade 44 carried by said slide is drawn through the work 29 at the point where the latter is under slight tension, and is firmly clamped between the clamp bar 37 and the cutter beam 38, thus producing an oblique incision 32 (Figure 1) in the work.

As the slide 48 reaches the end of its traverse, cam shaft 61 has rotated sufficiently to bring the cam surface 87a of cam 87 into engagement with cam roller 74, with the result that the three-arm crank is moved angularly upon its pivot 86 so as to raise the cutter beam 38 to its elevated, inoperative position shown in Figure 9. Because of the bowed construction of the clamp bar 37, the cutter beam will separate from the work 29 progressively from opposite sides thereof, the arrangement assuring that the work will not adhere to the cutter beam and be lifted thereby. Immediately after the cam 87 engages cam roller 74, one of the cams 93 or 94, depending upon the direction that the motor 55 is being driven, engages a switch lever 91 or 92, as the case may be, and thereby operates the corresponding switch to open the circuit of said motor 55 to stop the drive of the latter. This completes a cycle of operation of the apparatus, which cycle automatically is repeated since the operation of the switch that stops the motor 55 also closes the circuit of the motor 19 to effect the driving of the latter. As the severed work reaches the delivery end of the apparatus the severed, bias cut units are manually removed.

Although the work strip 29 is completely severed by the blade 44 in the medial longitudinal region of the clamp bar 37, the work strip will move smoothly over the latter without buckling upon subsequent feeding movement of the conveyor belt 17.

From the foregoing it will be apparent that the invention has many points of superiority over prior art structures, either of vertical or horizontal type. It makes possible accuracy of dimension of the product, even for relatively long lengths thereof where accuracy of dimension heretofore has been practically impossible to attain. The apparatus provides in a simple manner for the production of units of different lengths in successive series. The apparatus operates with fewer operators than heretofore has been required, it may be set up for cutting different lengths of units in relatively short time, there is less distortion of the work as compared to vertical bias cutters, and it achieves the other advantages set out in the foregoing statement of objects.

Modification may be resorted to without departing from the spirit of the invention or the scope thereof as defined by the appended claims.

What is claimed is:

1. In a cutter, the combination of conveyor for supporting a continuous length of strip material to be cut, means for intermittently moving said conveyor a determinate distance forwardly, a double bladed reciprocating cutter traversing the conveyor for severing the material thereon in both directions and between operative phases of the conveyor-moving means, and means for effecting the starting of said conveyor-moving means before the cutter reaches the end of its stroke, but after the clamp bar is raised.

2. A bias cutter comprising an endless conveyor for supporting a continuous strip of material to be cut, a pair of rollers supporting said conveyor at opposite ends thereof, a motor driving one of said rollers, speed reduction gearing operatively associated with one of said rollers, electrical switch means for controlling said motor, and cam means driven by said gearing for operating said switch means.

3. A bias cutter comprising a conveyor for supporting a continuous strip of material to be cut, a pair of rollers supporting said conveyor at opposite ends thereof, a motor driving one of said rollers, speed reduction gearing operatively associated with one of said rollers, electrical switch means controlling said motor adapted to slow down the speed of the motor and thereafter to stop the same, and cam means driven by said gearing adapted to operate said switches in succession.

4. A bias cutter comprising a conveyor for supporting a continuous strip of material to be cut, a motor drive for said conveyor, a cutter movable back and forth transversely of said conveyor for severing the material thereon, a reversible motor for so moving said cutter, means controlled by the travel of the conveyor for concurrently stopping the conveyor motor and starting said cutter motor, a pair of electrical switches controlling the stopping of the cutter motor and starting of said conveyor motor, a pair of cams driven by the cutter motor adapted alternatively to operate the respective switches of said pair of switches when the cutter motor is operated in reverse directions, said switches controlling the direction of rotation of the cutter motor when it is next energized.

5. A bias cutter comprising a conveyor for supporting a continuous strip of material to be cut, means for intermittently advancing said conveyor a determinate distance, a stationary clamp bar extending transversely over the conveyor and under the material thereon, a cutter beam disposed parallel to the clamp bar above the work and adapted to be raised and lowered to confine the work strip between said cutter beam and said clamp bar, a cutter movable longitudinally of the cutter beam for severing the work adjacent where it is engaged by the latter, and a single motor operating said cutter beam and cutter during intervals that the conveyor is stationary, said clamp bar being upwardly bowed from its opposite ends through its medial region to facilitate uniform clamping pressure on the work.

6. A bias cutter comprising a conveyor for supporting a continuous strip of material to be cut, means periodically advancing said conveyor a determinate distance forwardly, a stationary clamp bar extending transversely over the conveyor and under the material thereon, a cutter beam disposed parallel to the clamp bar above the work and adapted to be lowered to confine the work strip between itself and the clamp bar, a cutting blade carried by said cutter beam and movable longitudinally thereof for severing the work in the confined region thereof, and a reversible motor adapted to move said cutting blade back and forth along said cutter beam and to lower and raise the latter with each traverse of said blade during intervals that the conveyor is stationary.

7. A bias cutter comprising a conveyor for supporting an endless strip of material to be cut, an electric motor for periodically advancing said conveyor a determinate distance forwardly, a stationary clamp bar extending transversely over the conveyor and under the material thereon, a cutter beam disposed parallel to the clamp bar above the material thereon and adapted to be lowered to confine the material between itself and the clamp bar, a cutting blade carried by said cutter beam and movable longitudinally thereof for severing the material medially of the confined area of the latter, a cable connected to opposite sides of the cutter and trained about a sheave at one end of the cutter beam, a pair of sheaves at the opposite end of the latter upon which the respective ends of the cable are wound, a countershaft supporting said pair of sheaves, a cam shaft, speed-reduction gearing between said countershaft and said cam shaft, cam means on the cam shaft for raising and lowering the cutter beam, a reversible motor driving said countershaft, switch means controlling the stopping of the cutter motor, and cam means on the cam shaft for operating said switch means before the cam shaft has made a complete revolution in either direction.

8. A combination as defined in claim 7 including switch mechanism operated by the last mentioned cam means for starting the conveyor motor.

9. In a cutting apparatus, a conveyor for supporting a continuous strip of material to be cut, means for intermittently operating said conveyor to move said material to be cut, a cutting bar arranged adjacent to but slightly spaced from said conveyor and having an inclined surface to guide said material from said conveyor and over said bar, means associated with said bar for clamping said material against said bar, and means for severing said material adjacent the region where it is clamped to said bar.

10. A combination as defined in claim 9, characterized in that said cutting bar has a plane surface at the upper end of said inclined surface, and that the clamping means clamps the material against said plane surface, and that said cutting means is adapted to move transversely of said plane surface and longitudinally of said bar.

11. In a bias cutter of the type described, the combination of a conveyor for supporting a continuous length of material to be cut, electric motor means for driving said conveyor, automatic means for stopping said motor after it has driven the conveyor a determinate distance, a cutting device movable across said conveyor in opposite directions for severing the material thereon, a second motor for moving said cutting device, automatic means operated by said conveyor motor for alternately reversing said second motor after alternate stops of said conveyor motor, effected by said automatic means.

12. In a bias cutter of the type described, the combination of a conveyor for supporting continuous lengths of material to be cut, an electric motor means for driving said conveyor, automatic means for starting and stopping said motor after it has driven said conveyor a predetermined distance, a cutting device movable across said conveyor for severing the material thereon, a second motor for moving said cutting device, automatic means operated by said conveyor for first reducing the speed of said conveyor motor until said motor has ceased to decelerate and to thereafter de-energize said conveyor motor, electrical interlock means effected by the operation of said conveyor and the movement of said severing device for alternately reversing said second motor after alternate stops of said first motor by certain automatic means.

RAYMOND WILLCOX ALLEN.